US012449197B1

(12) United States Patent
Parle et al.

(10) Patent No.: US 12,449,197 B1
(45) Date of Patent: Oct. 21, 2025

(54) TIMBER DRYING KILN ELECTRICAL CONTACT SYSTEM, A TIMBER DRYING KILN MOISTURE MEASUREMENT SYSTEM AND A TIMBER DRYING KILN MOISTURE MEASUREMENT METHOD

(71) Applicant: Windsor Engineering Group Limited, Porirua (NZ)

(72) Inventors: David Jack Parle, Wellington (NZ); Daniel William Young, Brevard, NC (US)

(73) Assignee: Windsor Engineering Group Limited, Porirua (NZ)

( * ) Notice: Subject to any disclaimer, the term of this patent is extended or adjusted under 35 U.S.C. 154(b) by 0 days.

(21) Appl. No.: 19/175,864

(22) Filed: Apr. 10, 2025

(51) Int. Cl.
*F26B 3/20* (2006.01)
*F26B 25/00* (2006.01)
*F26B 25/22* (2006.01)

(52) U.S. Cl.
CPC .............. *F26B 3/20* (2013.01); *F26B 25/003* (2013.01); *F26B 25/22* (2013.01); *F26B 2210/16* (2013.01)

(58) Field of Classification Search
CPC .......... F26B 3/80; F26B 25/003; F26B 25/22; F26B 2210/16
(Continued)

(56) References Cited

U.S. PATENT DOCUMENTS

RE31,633 E * 7/1984 Lewis ..................... F26B 21/02 34/381
4,620,373 A * 11/1986 Laskowski .............. F26B 23/06 34/406
(Continued)

FOREIGN PATENT DOCUMENTS

| | | | | |
|---|---|---|---|---|
| AU | 2001290387 C1 * | 4/2002 | | |
| WO | WO-0225192 A1 * | 3/2002 | .............. | F26B 15/12 |
| WO | 2015093986 A1 | 11/2014 | | |

OTHER PUBLICATIONS

Printout about Wellons Trumark System, available at https://www.wellons.com/tcs.html, presently believed to be publicly available at least before Apr. 10, 2025 (6 pages).
(Continued)

*Primary Examiner* — Stephen M Gravini
(74) *Attorney, Agent, or Firm* — Fitch, Even, Tabin & Flannery LLP

(57) ABSTRACT

A kiln moisture measurement system is provided for measuring the moisture content of a charge of timber in a timber drying kiln, and comprises first and second electrically conductive elements spaced apart in the kiln on respective mounts, with the charge of timber between the electrically conductive elements. The first and second electrically conductive elements are connected to an electronic controller such that electric charge can be transmitted between the first and/or second electrically conductive element and the electronic controller. The electrically conductive elements are each resiliently movable against respective contact portions of the charge of timber when the charge of timber is adjacent the first electrically conductive element and the second electrically conductive element. The electronic controller is subsequently configured to measure one or more dielectric properties of a portion of the timber between the electrically conductive elements to determine a moisture level of the charge of timber.

20 Claims, 11 Drawing Sheets

(58) Field of Classification Search
USPC .............................................................. 34/143
See application file for complete search history.

(56) References Cited

U.S. PATENT DOCUMENTS

| | | | | | |
|---|---|---|---|---|---|
| 5,758,434 | A * | 6/1998 | Gipson | F26B 21/08 34/514 |
| 6,327,910 | B1 * | 12/2001 | Beall | F26B 25/185 73/598 |
| 6,463,794 | B1 | 10/2002 | Moshe et al. | |
| 6,703,847 | B2 | 3/2004 | Venter et al. | |
| 6,772,535 | B2 * | 8/2004 | Koslow | F26B 21/02 34/225 |
| 6,989,678 | B2 | 1/2006 | Venter et al. | |
| 7,146,747 | B2 * | 12/2006 | Studd | F26B 21/06 34/492 |
| 7,748,137 | B2 * | 7/2010 | Wang | A01G 9/243 34/396 |
| 8,397,400 | B2 * | 3/2013 | Choo | F26B 9/06 34/396 |
| 9,222,906 | B2 * | 12/2015 | Youssi | G01N 33/46 |
| 10,757,960 | B2 * | 9/2020 | Tanaka | B01J 19/087 |
| 11,313,621 | B2 * | 4/2022 | Fredric | F26B 25/22 |
| 11,384,980 | B2 * | 7/2022 | Triglia, Jr. | F26B 13/008 |
| 2003/0192461 | A1 * | 10/2003 | Logan | F23G 5/02 110/342 |

OTHER PUBLICATIONS

Printout about Dryzone, In-Kiln Moisture Measure System, available at https://www.dryzone.co.za/, presently believed to be publicly available at least before Apr. 10, 2025 (7 pages).
Sales flyer for Drizone, In-Kiln Moisture Measurement from Drizone Technologies, presently believed to be publicly available at least before Apr. 10, 2025 (1 page).

* cited by examiner

TIMBER DRYING KILN ELECTRICAL CONTACT SYSTEM, A TIMBER DRYING KILN MOISTURE MEASUREMENT SYSTEM AND A TIMBER DRYING KILN MOISTURE MEASUREMENT METHOD

FIELD OF THE DISCLOSURE

This disclosure relates to a timber drying kiln electrical contact system for a kiln moisture measurement system, a timber drying kiln moisture measurement system, and a timber drying kiln moisture measurement method, for measuring the moisture content of timber using electromagnetic measurement, and more specifically using the dielectric properties of the timber.

BACKGROUND TO THE DISCLOSURE

Any discussion of the prior art throughout the specification should in no way be considered as an admission that such prior art is widely known or forms part of common general knowledge in the field.

Timber drying kilns are commonly used to remove moisture from a charge of timber, for example a charge of sawn timber. Three common types of timber drying kiln are batch kilns, progressive kilns and continuous drying kilns.

The most common timber drying kiln is the batch kiln, which comprises a sealed chamber where heating, airflow, and humidity can be controlled. The charge is loaded into the chamber, which is then heated to provide drying conditions. During the drying process, the charge remains stationary. The chamber is then opened and the charge is removed. Drying kilns in the form of batch kilns typically have one door through which the charge enters, and the same or another door through which the charge exits the chamber.

Progressive kilns typically comprise one or more independently heated, sealed chambers. Therefore, progressive kilns are slightly modified batch kilns and operate like a batch kiln. The chambers can be placed end to end and they may have doors at each end. The charge is placed into the first chamber, which is sealed and brought up to the required pre-drying conditions. The chamber is then opened, and the charge is moved into the next chamber, which is then sealed and brought up to the required drying conditions. Next, the charge is moved into the conditioning chamber, which is sealed and brought up to the required conditioning conditions. Each chamber may be independently powered and the thermal energy may be vented into the environment after each stage, or recirculated or reused, for example via ducting into another chamber. The amount by which the charge moves through the chambers is dependent on the size of the chamber and the batch size.

Continuous kilns incorporate multiple sub chambers or treatment phases all in one extended chamber, with each sub chamber subjecting the timber to different conditions, as the timber moves through the extended chamber. For example, there may be sub chambers for pre-heating, drying, cooling, and conditioning, all in one extended chamber.

Dual path continuous kilns typically consist of two tracks or paths of timber on carts travelling in opposite directions through the chamber. Green timber is introduced at each end of the chamber on opposing paths. There is a heating zone in the middle of the chamber and a heat transfer zone at each end. In the heat transfer zones, heat from the dried timber on one path is transferred by fans to the green timber on the other path, in order to improve the efficiency of the drying process. Each of the two rows of carts may move continuously or in increments, and the chamber has no sealed doors.

An example of a continuous kiln is described in international patent application WO2015/093986 (PCT/NZ2014/050008) filed on 6 Nov. 2014, the entire contents of which are hereby incorporated by reference.

Efficient use of timber drying kilns requires the ability to measure the moisture content of the timber being dried, with an aim being to dry the timber to a desired moisture content. It is desirable to avoid overdrying of the timber, and also desirable to avoid having to perform a further drying operation on timber that has been insufficiently dried in the first instance.

To this end, efficient operation of a timber drying kiln requires the assessment of the moisture content of a cross section of timber. The ability to determine endpoint moisture contents in the kiln, e.g. during the drying operation of the kiln, allows more uniform product quality and decreased drying costs as there are reduced instances of overdrying or the need to repeat a drying operation. Opening the door of a kiln where the kiln is still warm causes a loss of thermal energy, and if it is determined that the charge requires further drying, the kiln will need to be reheated to restore the drying conditions, requiring additional energy.

In situ methods of determining the moisture content of drying materials in a kiln are known. For example, U.S. Pat. No. 6,463,794 describes a system for determining the moisture content of plant matter by measuring the temperature, humidity and flow rate of forced air entering and exiting a heating area.

Another method of measuring moisture content in timber is described in U.S. Pat. Nos. 6,989,678 and 6,703,847, the entire contents of which are hereby incorporated by reference. These patents describe a system for determining the moisture content of timber in a kiln by insertion of electrodes and/or capacitance plates into spaces between layers in a stack of timber, wherein capacitive and/or resistive parameters are used to determine a value corresponding to a moisture content.

However, current endpoint moisture measurement systems using electrodes and/or capacitance plates are difficult to handle, especially in a continuous kiln environment, since they need to be loaded into each stack before entry into the kiln, and removed after exit.

FIGS. 1 to 4 show an example of a kiln 1 comprising a drying chamber 13 in which a timber stack 15 is located. Two metal plates 3, 5 have been inserted into the timber stack 15. One of the metal plates 5 may comprise an earth connection with part of the kiln, for example with a carriage 19 on which the timber stack 15 is loaded. The metal plates 3, 5 are electrically connected to an electrical system (not shown) via remotely operated arms 6 (FIGS. 1 and 2), or via wires 8 (FIGS. 3 and 4), or by an electronic sender unit attached to the plates 3, 5. The moisture content of the timber between the plates 3, 5 can be determined, where the timber between the plates 3, 5 acts as a dielectric having one or more dielectric properties which affects, for example, the capacitance of the plates 3, 5. This can be used to determine the moisture content, either via look-up tables generated from testing, or via one or more algorithms.

Charges of timber may be higher than the height of an operator (often over 2 meters high), and sometimes the charge of timber may be assembled sub-adequately; for example, the charge of timber may be leaning to one side, or may be unsteady (e.g. the charge of timber may wobble or become unstable during movement). Thus, charges of timber pose a health and safety risk to operators as there is a risk that the charge may topple. Requiring operators to approach a charge of timber to install moisture reader electrodes or plates into the charge of timber therefore presents a hazard.

Moisture readers may not be able to be installed until the charge of timber has reached, or is already inside, a drying kiln. Requiring operators to enter a kiln to install moisture readers into a charge of timber located in a kiln also presents health and safety risks, as wood drying kilns are hazardous for numerous reasons, including being a high temperature environment and/or an enclosed space which may harbour noxious fumes or gases.

It would be desirable to provide a kiln moisture measurement system which did not require an operator to enter the kiln.

Timber stacks that are assembled for drying often have differences in shape, making automatically placing electrical connections difficult or inconsistent.

Moisture measurement systems that use the dielectric properties of the timber require repeatable conditions between the plates to enable the system to be calibrated so as to provide repeatable and reliable moisture content readings. This is a reason why in prior art systems, metal plates are manually placed in the timber stack.

A further problem is that in particularly cold environments, moisture reader plates may freeze to the charge of timber if the charge cools substantially. This creates a health and safety risk, as well as being inconvenient, for the operators who will need to detach the moisture reader probes.

Charges of timber have different properties (e.g. relative permittivity, density, moisture content) at different locations. In particular the moisture content of timber in the charge or stack of timber can vary significantly in different parts of the charge. This means that multiple measurements often need to be taken at different parts of a charge of timber in order to determine a representative or average moisture content or to ensure that the entirety of the charge is sufficiently dry.

If moisture measuring systems are not easy to use they will often not be used by operators, and the advantages and economic gains enabled by in situ moisture measuring processes will not be realised in practice.

Object of the Disclosure

It is an object of the disclosure to provide a timber drying kiln electrical contact system, and/or a timber kiln moisture measurement system and/or a timber kiln moisture measurement method for measuring the moisture content of timber, which mitigates one or more of the aforementioned problems, or to at least provide the public with a useful choice.

SUMMARY OF THE DISCLOSURE

In accordance with this disclosure, a timber drying kiln electrical contact system, a timber kiln moisture measurement system, and a timber drying kiln measurement method is provided which eliminates the need for metal plates to be inserted into the timber stack.

In one aspect of this disclosure, there is provided a timber drying kiln electrical contact system for a timber drying kiln comprising at least one timber drying chamber; the electrical contact system comprising:

a first electrically conductive element; a first mount and a first electrical connector;

a second electrically conductive element, a second mount and a second electrical connector;

wherein the first and second mounts are configured to respectively mount the first electrically conductive element and the second electrically conductive element inside the timber drying chamber such that the first electrically conductive element and the second electrically conductive element are spaced apart; and wherein the first electrical connector is configured to electrically connect the first electrically conductive element to an electronic controller of the kiln moisture measurement system, and the second electrical connector is configured to electrically connect the second electrically conductive element to an electronic controller, such that electric charge can be transmitted between the first and/or second electrically conductive elements and the electronic controller;

wherein the first electrically conductive element and the second electrically conductive element are each resiliently movable against respective contact portions of the charge of timber.

The first and second electrically conductive elements may be movably mounted on their respective mounts, so as to be resiliently movable relative to their respective mounts.

Each mount may be configured to be movably mounted to the kiln chamber such that each electrically conductive element and their respective mount are together resiliently movable relative to the timber drying chamber.

Each electrically conductive element may be resiliently deformable, such that each electrically conductive element resiliently deforms upon contact with the charge of timber.

Each electrically conductive element may continuously resiliently deform as the charge of timber moves into and/or along the timber drying chamber.

Each electrically conductive element may be configured to resiliently deform so as to at least partially conform to the shape of the contact portion of the charge of the timber that is in contact with each electrically conductive element.

Each electrically conductive element may be elongate and comprises a proximal end at the mount, and a distal end configured to contact the charge of timber, each electrically conductive element being configured to resiliently flex along its length between the proximal and distal ends.

Each electrically conductive element may comprise a single flexible electrically conductive member.

Each electrically conductive element may comprise a flexible electrically conductive strip.

Each electrically conductive element may comprise a plurality of flexible electrically conductive members.

Each electrically conductive member may comprise an electrically conductive brush comprising a plurality of electrically conductive bristles.

One or both of the first and second electrically conductive members may be rotatably mounted on their respective mounts.

One of, or each, electrically conductive member may be made of or comprise one or more metals.

One of, or each, electrically conductive member may be made of or comprise one or more non-metals.

One of, or each. electrically conductive member may be made from or comprise a carbon material.

The system may comprise the electronic controller.

According to another aspect of this disclosure there is provided a kiln moisture measurement system for measuring the moisture content of at least a portion of a charge of timber in a timber drying kiln comprising at least one timber drying chamber; the kiln moisture measurement system comprising:

a first electrically conductive element; a first mount and a first electrical connector;

a second electrically conductive element, a second mount and a second electrical connector;

wherein the first and second mounts are configured to respectively mount the first electrically conductive element and the second electrically conductive element inside the timber drying chamber such that the first electrically conductive element and the second electrically conductive element are spaced apart; and wherein the first electrical connector is configured to electrical connect the first electrically conductive element to the electronic controller, and the second electrical connector is configured to electrically connect the second electrically conductive element to the electronic controller, such that electric charge can be transmitted between the first and/or second electrically conductive element and the electronic controller;

wherein the first electrically conductive element and the second electrically conductive element are each resiliently movable against respective contact portions of the charge of timber when the charge of timber is adjacent the first electrically conductive element and the second electrically conductive element; and wherein the electronic controller is subsequently configured to:

measure one or more dielectric properties of a portion of the timber between the first electrically conductive element and the second electrically conductive element; and to subsequently determine a moisture level of the charge of timber based on the measured one or more dielectric properties.

The first electrically conductive element and the second electrically conductive element may be mounted on opposed sides of the chamber of the kiln.

The first electrically conductive element and the second electrically conductive element may be mounted such that the one or more dielectric properties are measured substantially transversely across the chamber.

The first electrically conductive element and the second electrically conductive element may be mounted such that the one or more dielectric properties are measured substantially longitudinally along the chamber.

The first electrically conductive element and the second electrically conductive element may be mounted such that the one or more dielectric properties are measured along an inclined path through the chamber.

The charge of timber has a primary dimension, wherein the first electrically conductive element and the second electrically conductive element may be spaced apart across the primary dimension of the charge of timber, the primary dimension is the width, length or height of the charge of timber.

The mounts may extend from the or a side wall, floor or ceiling of the chamber of the kiln.

The one or more dielectric properties may be measured across a distance through the charge of timber of between 1 and 5 meters.

According to another aspect of this disclosure there is provided a timber drying kiln comprising the timber drying kiln electrical contact system and/or kiln moisture measurement system of any one or more of the above statements.

The kiln may comprise a single chamber configured to dry a charge of timber with the charge of timber in a single position in the chamber.

The kiln may comprise multiple chambers, wherein the or each charge of timber can be moved to each chamber.

Each chamber may be configured to deliver different conditions to the or each charge of timber.

The kiln may comprise one or more pathways along which the charge of timber can be moved through the or each chamber.

The kiln may comprise a plurality of pathways, configured such that a first charge of timber can be moved along a first pathway in a first direction, and further configured such that a second charge of timber can be moved along a second pathway in a second, opposed direction.

According to a further aspect of this disclosure there is provided a kiln moisture measurement method for measuring the moisture level of a charge of timber in a chamber of a timber drying kiln, including steps of:

moving the charge of timber into contact with a pair of resiliently movable electrically conductive elements such that the electrically conductive elements resiliently contact respective contact portions of the charge of timber;

using an electronic controller to apply electrical charge to one or both of the electrically conductive elements;

using the electronic controller to subsequently measure one or more dielectric properties of the timber between the first electrically conductive element and the second electrically conductive element;

subsequently determining a moisture level of the charge of timber based on the measured one or more dielectric properties.

This disclosure may also be said to broadly consist in the parts, elements, and features referred to or indicated herein, individually, or collectively, and any or all combinations of any two or more said parts, elements, or features. Where specific integers are mentioned herein that have known equivalents in the art to which the disclosure relates, such known equivalents are deemed to be incorporated herein as if individually set forth.

BRIEF DESCRIPTION OF THE DRAWINGS

Preferred forms of the disclosure will now be described by way of example only and with reference to the accompanying drawings, in which.

DETAILED DESCRIPTION OF THE DISCLOSURE

The disclosure will be described with reference to a moisture content measuring system in a solid timber heating and/or drying kiln for processing solid timber. It will be appreciated that the disclosure is not intended to be limited only to timber heating and drying kilns. This disclosure also relates to a timber drying kiln electrical contact system configured to contact timber to be heated or dried.

The stack of solid timber to be processed is referred to herein as a charge. Charges of timber for drying are usually stacks of sawn timber arranged so as to have a width of between 1.5 and 5 metres, usually between 2.4 and 3.6 meters, and are supported on a carriage or other timber charge transporting apparatus or mechanism, so that the charges may be moved efficiently into, through, and out of the kiln.

For example, a charge of timber may comprise 20 to 30 layers of 2.4 m or 3.6 m long timber, in which each layer comprises 20 to 30 lengths. Each layer is separated by, for example, hardwood fillets. The fillets are typically hardwood, softwood, LVL or a metal such as aluminium.

Figure 1:
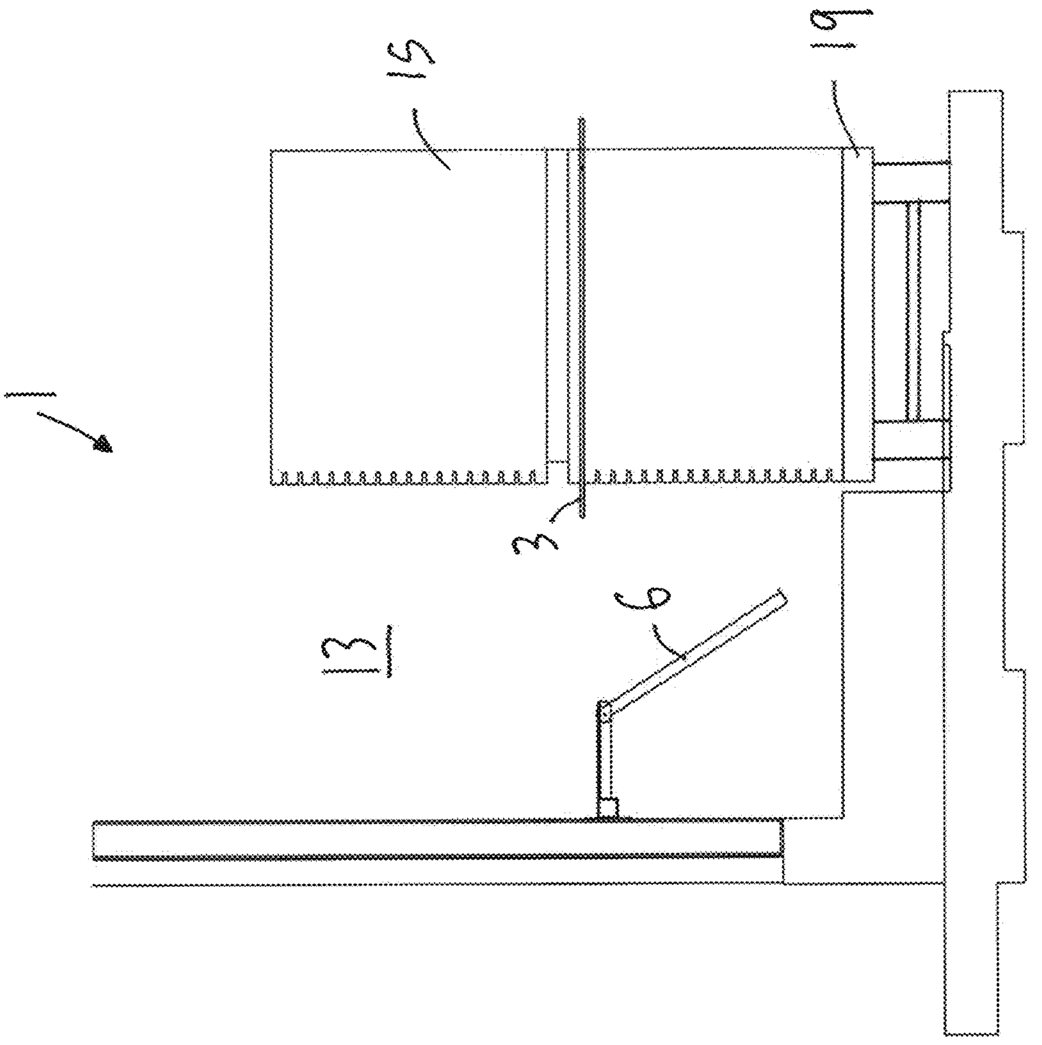
FIGS. 1 and 2 are end views of a prior art kiln in which a cart carrying a timber stack are located. A prior art timber moisture measurement system is shown using metal plates inserted into the timber stack. The metal plates are selectively connected to an electrical control system (not shown) via movable metal arms, with FIG. 1 showing the arms in a disconnected position, and FIG. 2 showing the arms in a connected position.
Figure 2:
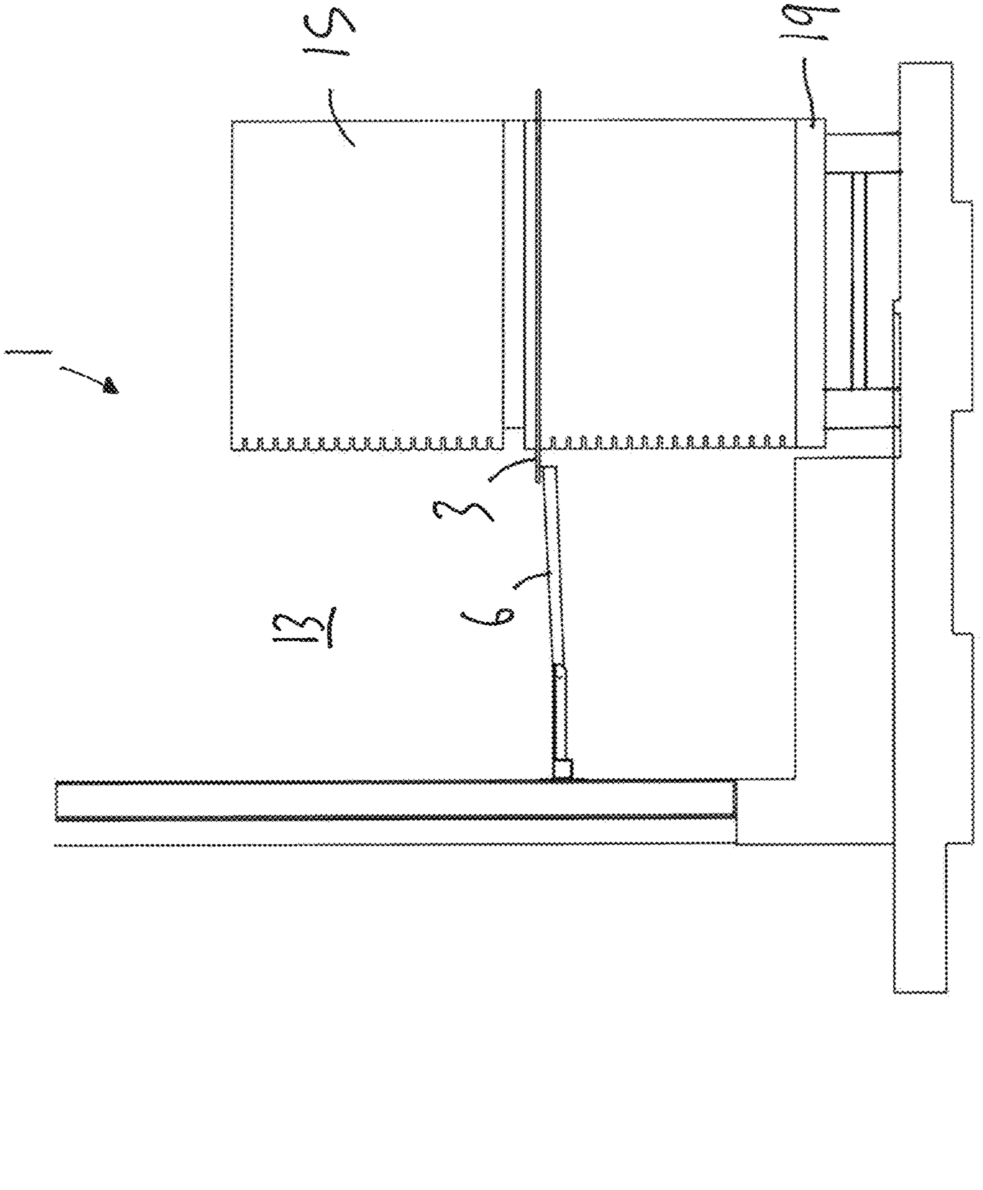
Figure 3:
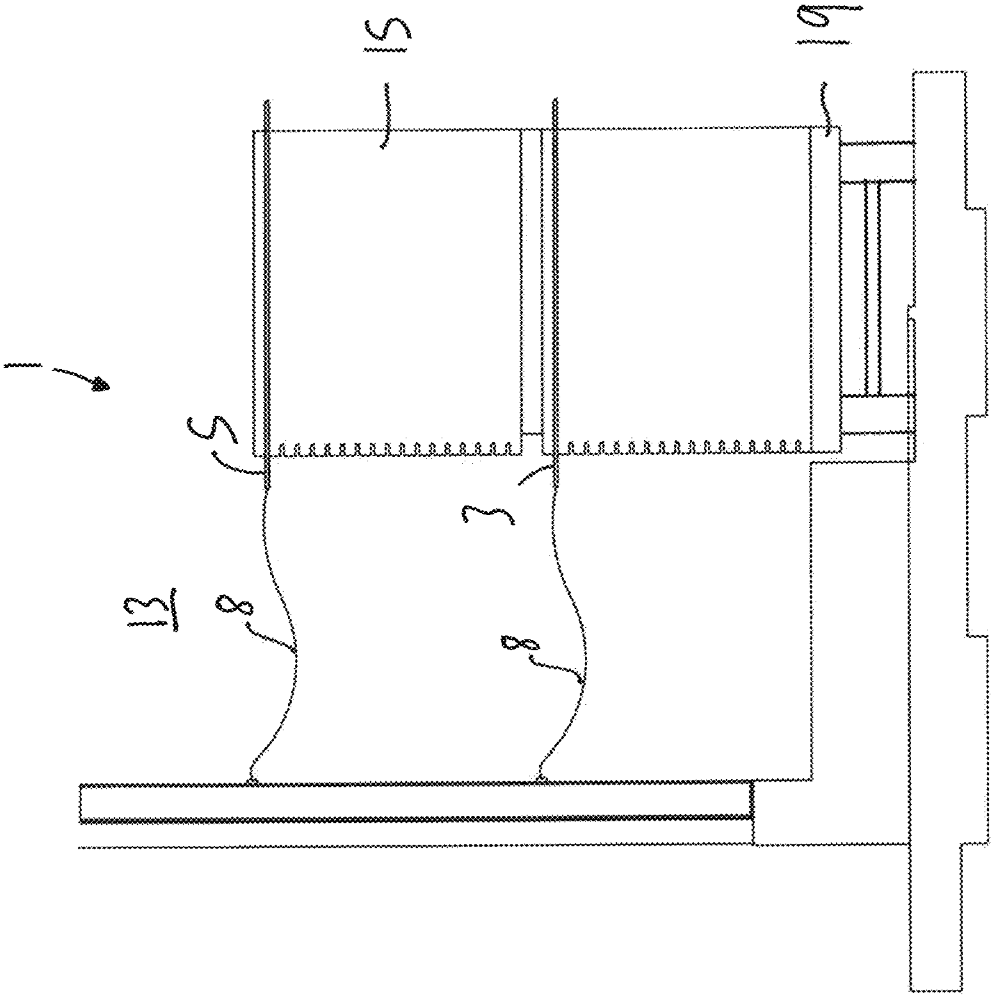
FIG. 3 is an end view of a prior art kiln having similar features to the prior art kiln of FIG. 1. The metal plates are connected to an electrical control system (not shown) via wires.
Figure 4:
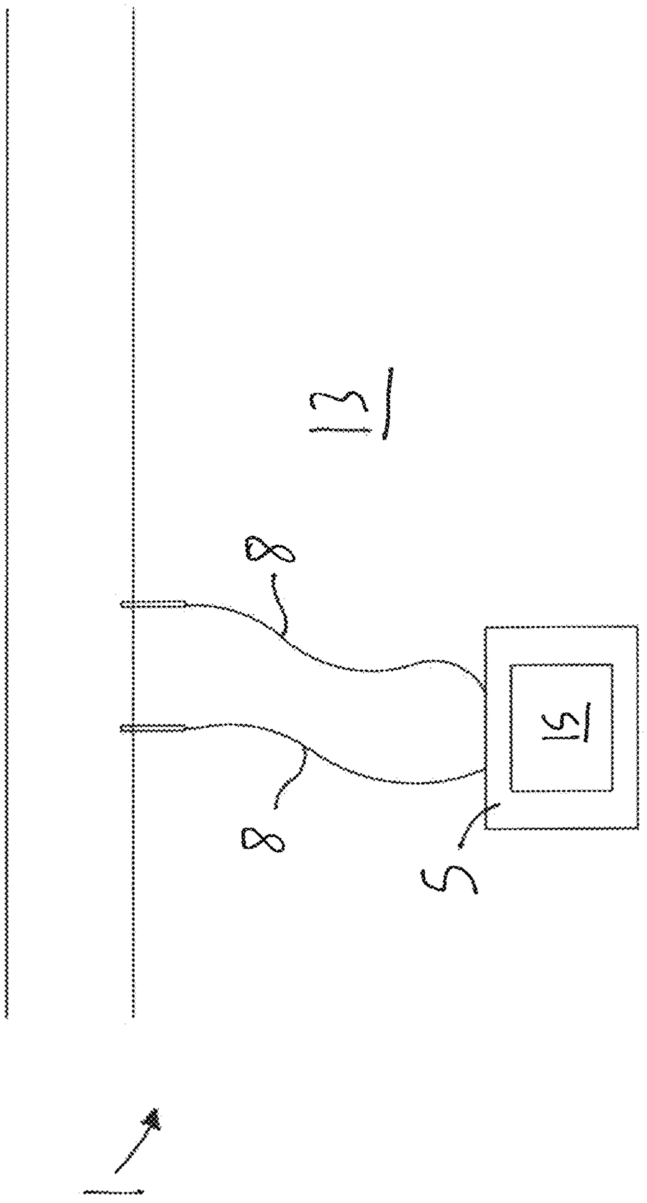
FIG. 4 is a plan view corresponding to FIG. 3.
Figure 5:
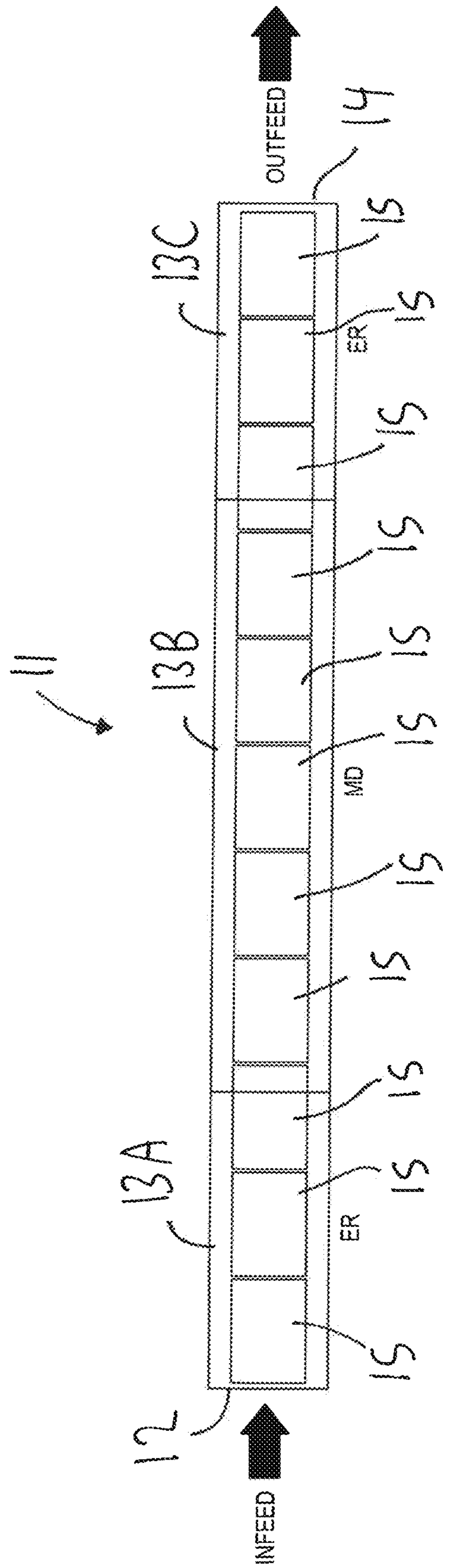
FIG. 5 is a schematic plan view of a continuous direction kiln (a CDK) in which a moisture measurement system in accordance with the present disclosure may be used.

With reference to FIG. 5, one example of a kiln with which a moisture measurement system in accordance with this disclosure may be used, is a Continuous Drying Kiln, or CDK, 11 comprising an elongate building which comprises multiple drying chambers 13A, 13B, 13C spaced along an elongate path through the CDK 11. A charge of timber 15 enters the CDK 11 at an infeed end 12, and first enters pre-heating chamber 13A. The timber charge 15 progresses through the CDK 11, subsequently entering a main drying chamber 13B and then a final chamber 13C before leaving the CDK 11 via an outfeed end 14. Multiple charges of timber 15 can be continuously fed into the CDK 11, each charge of timber 15 gradually progressing through the chambers 13A, 13B, 13C.

Figure 6:
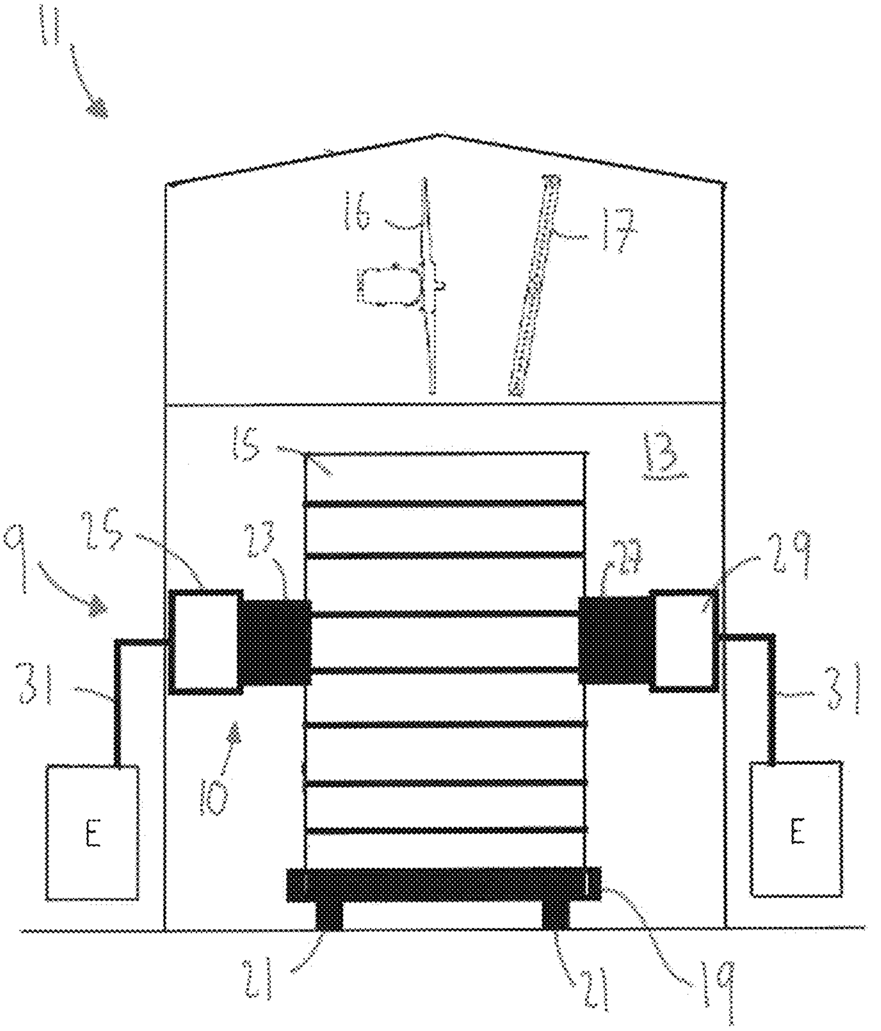
FIG. 6 is an end view of a single path timber drying kiln including a moisture measurement system in accordance with the present disclosure.

With reference to FIG. 6 a moisture measurement system 9 is installed in a timber heating and/or drying kiln 11 having a chamber 13 for receiving a charge of timber 15. The kiln 11 further comprises a heating system which may comprise a fan 16 and a heater 17 configured to heat the chamber 13. The kiln 11 may be a CDK 11 as described above, or may be any other suitable type of timber drying kiln.

The length, height and/or width of the chamber 13 may be customised to suit different sites and charges 15 of different sizes and lengths. In an example in accordance with the present disclosure, the kiln 11 has a width of about 5 meters and length of about 40 meters, and the charge of timber 15 has a width of between 1.5 and 5 meters, usually 2.4 meters to 3.6 meters.

The charge of timber 15 typically comprises a stack of lengths of timber, stacked onto a carriage 19. The carriage 19 is provided with rollers or wheels 21 to enable the charge of timber to be moved into, through and out of the chamber 13.

The kiln moisture measurement system 9 is configured to measure the moisture content of at least a portion of the charge of timber 15 in the timber drying kiln 11.

To facilitate moisture measurement of the charge of timber 15, a timber drying kiln electrical contact system 10 is provided comprising:

- a first electrically conductive element 23, a first mount 25 and a first electrical connector; and
- a second electrically conductive element 27, a second mount 29; and a second electrical connector.

The timber drying kiln electrical contact system 10 may be configured to be retrofitted to existing kilns, to replace the use of metal plates 3, 5 as described with reference to FIGS. 1 to 4 for example.

The first electrical connector may comprise one or more wires 31 and/or one or more other electrically connective components that are electrically connected to the first electrically conductive element 23. The one or more wires 31 may be releasably connected to the first electrical conductive element 23 for example via suitable connector block, or may be non-releasably connected via soldering or the like. Likewise, the second electrical connector may comprise one or more wires 31 and/or one or more other electrically connective components.

The first electrical connector is configured to connect the first electrically conductive element 23 to an electronic controller E of the kiln moisture measurement system 9, and the second electrical connector is configured to connect the second electrically conductive element 27 to an electronic controller E of the kiln moisture measurement system 9, such that the first and/or second electrical connector can receive and/or transmit electrical charge from and/or to the electronic controller E, or at least an electrical power source controlled by the electronic controller E.

The first and second mounts 25, 29 are configured to respectively mount the first electrically conductive element 23 and the second electrically conductive element 27 inside the timber drying chamber 13 such that the first electrically conductive element 23 and the second electrically conductive element 27 are spaced apart.

Each of the first electrically conductive element 23 and the second electrically conductive element 27 are resiliently movable relative to the charge of timber 15 such that the first electrically conductive element 23 and the second electrically conductive element 27 resiliently movably contact respective portions of the charge of timber 15 when the charge of timber 15 is moved to a position inside the drying chamber 13. For example, the first and second electrically conductive elements 23, 27 can resiliently deform upon contact with the charge of timber 15, for example as the charge of timber 15 enters the drying chamber 13, and/or moves along the drying chamber 13. The first and second electrically conductive elements 23, 27 can continue to resiliently deform as the charge of timber 15 continues to move into a drying position in the drying chamber 13.

Alternatively or additionally, the charge of timber 15 could be positioned in the drying chamber 13, and the first and second electrically conductive elements 23, 27 moved into contact with the charge of timber 15, the first and second electrically conductive elements 23, 27 resiliently deforming upon contact with the charge of timber 15. For example, one or more parts of each of the first and second mounts may be movable relative to the charge of timber 15, to move the first and second electrically conductive elements 23, 27 into contact with the charge of timber 15.

The first electrically conductive element 23 and the second electrically conductive element 27 may be spaced apart in the chamber 13 such that the charge of timber 15 is positioned inbetween the first electrically conductive element 23 and second electrically conductive element 27, for example with first electrically conductive element 23 and the second electrically conductive element 27 spaced apart across the chamber 13.

The first electrically conductive element 23 and the second electrically conductive element 27 may be spaced apart along one side, or along the top, of the chamber, so that both of the first electrically conductive element 23 and the second electrically conductive element 27 are in contact with one side of charge of timber 15.

When the charge of timber 15 is so positioned such that the spaced apart electrically conductive elements 23, 27 are in contact with the charge of timber 15, the electronic controller E is subsequently configured to:

measure the capacitance of the portion of the charge of timber 15 that is positioned between the first electrically conductive element 23 and the second electrically conductive element 27; and to subsequently determine a moisture level of the portion of the charge of timber based on the measured capacitance.

Figure 8:
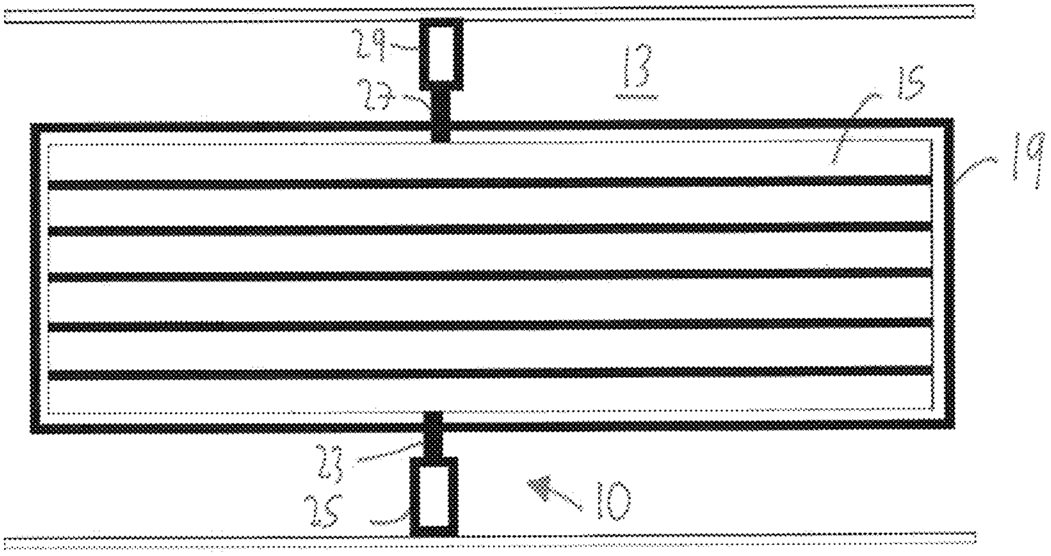
FIG. 8 is a plan view corresponding to FIG. 6.

With reference to FIGS. 6 and 8, the first and second electrically conductive elements may be mounted on opposing side walls of the chamber 13, by respective mounts 25, 29.

However, the first and second electrically conductive elements may be mounted on the wall, floor or ceiling of the chamber 13.

The mounts 25, 29 may be configured to space each of the first and second electrically conductive elements 23, 27 from the wall, floor and/or ceiling of the chamber 13.

In some instances the first and second electrically conductive elements 23, 27, and in particular the mounts 25, 29, could be free standing rather than directly mounted to the wall, floor or ceiling of the chamber.

The first and second electrically conductive elements 23, 27 are mounted in the chamber 13 so as to be spaced apart sufficiently that the charge of timber 15 can be moved into position such that the first and second electrically conductive elements 23, 27 are in contact with the charge of timber 15, such that the first and second electrically conductive elements 23, 27 function as conductive terminals, with the charge of timber 15 functioning as a dielectric between the conductive terminals.

An electric charge applied to the first and/or second electrically conductive elements 23, 27 is therefore affected by the dielectric properties of the portion of the charge of timber 15 between the first and second electrically conductive elements 23, 27. In particular the dielectric properties can cause a change in the electric charge that can be detected and measured by the electronic controller. This change in the electric charge is a signal indicative of the dielectric properties of the portion of the charge of timber 15. The dielectric properties signal can be received and processed by the electronic controller to determine the moisture content of the portion of the charge of timber, or be sent to a further, remote electronic controller, such as a remote server or laptop for example, to determine the moisture content.

The moisture content of the charge of timber 15 is proportional to the dielectric constant, and therefore one or more measurements of the dielectric properties of the material between the first and second electrically conductive elements 23, 27 can be measured by the controller E, and the moisture content subsequently calculated, either onsite or remotely. For example, this calculation could be via a look-up table that maps measured capacitance to moisture content as determined by testing, or may be calculated algorithmically by the electronic controller E, or by a remote electronic data processor. The moisture content calculation may also be temperature dependent.

Electronic controller E comprises the electronic equipment and circuitry necessary for generating and transmitting an electrical charge to the first and second electrically conductive elements 23, 27, and includes one or more electronic data processors.

The electronic controller E may be located inside the chamber 13, adjacent the chamber 13, or remote from the chamber 13.

For ease of access and protection of sensitive components, electronic controller E is located outside of the chamber 13 and is in electrical communication with the first and second electrically conductive elements 23, 27 via suitably temperature and humidity resistant communication cabling/leads 31.

Electronic controller E comprises a control circuit configured to control the charge of electricity supplied to the first and/or second electrically conductive elements 23, 27, and to control the processing of the capacitance signal and the subsequent calculation of the moisture content. Electronic controller E may comprise a protective outer housing or enclosure, inside which the control circuit 30 is retained.

High-temperature cabling 31 may be used to connect the first and second electrically conductive elements 23, 27 to electronic controller E outside of the chamber 13.

With reference to FIGS. 6 and 8, the first and second electrically conductive elements 23, 27 are mounted in the chamber 13 such that a straight line between the first and second electrically conductive elements 23, 27 is substantially perpendicular with the side surfaces of the timber charge 15. The first electrically conductive element 23 and the second electrically conductive element 27 are mounted on opposed sides of the chamber 13 of the kiln, such that the capacitance is measured substantially transversely across the chamber 13, in a direction substantially perpendicular to opposed side walls of the chamber 13.

Alternatively, the first and second electrically conductive elements 23, 27 may be positioned in the chamber 2 such that a straight line between the first and second electrically conductive elements 23, 27 is non-perpendicular with the side surfaces of the charge of timber 15.

The first and second electrically conductive elements 23, 27 may be positioned in the chamber 2 so as to be offset when viewed in plan, that is inclined across or along the kiln, so as to increase the length of the electrical path between the first and second electrically conductive elements 23, 27.

Figure 7:
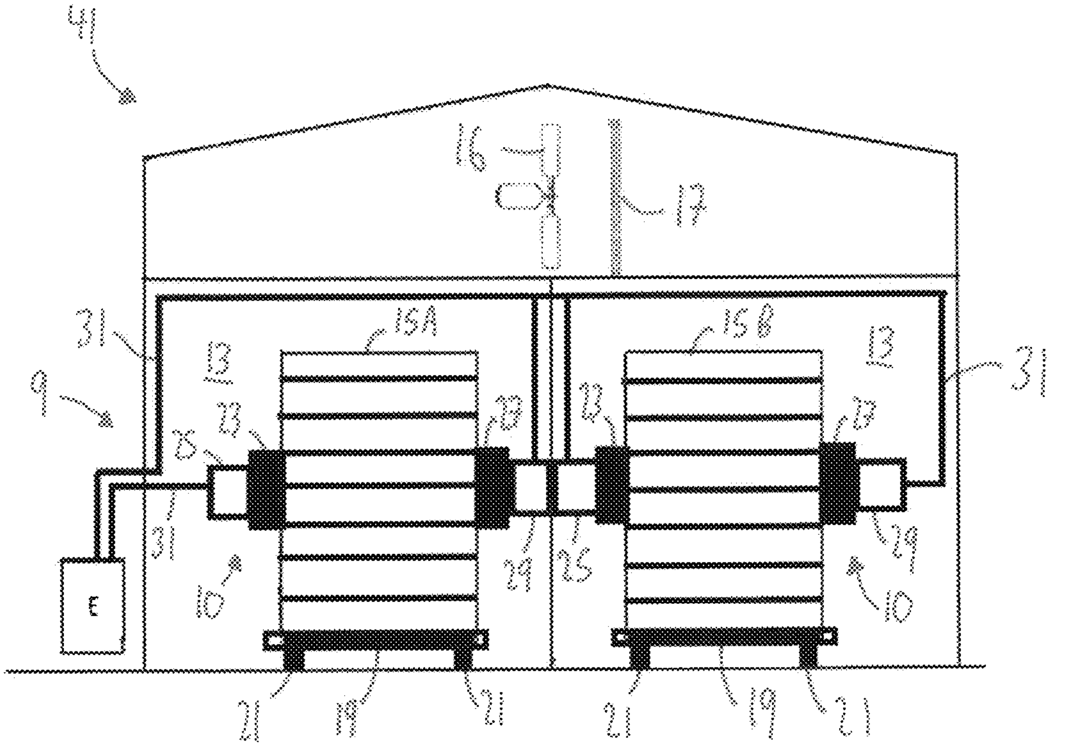
FIG. 7 is an end view of a dual path timber drying kiln including a moisture measurement system in accordance with the present disclosure.

With reference to FIG. 7, a double-track kiln 41 having a heating system comprising a fan 16 and heater 17 is configured to receive and dry two charges of timber **15*a*, 15*b* at the same time. To improve efficiency, double-track kilns 41 may operate continuously, and move charges 15*a*, 15*b* through a drying section of the kiln on automatically moving carriages 19. The charges 15A, 15*b* may move in the same direction through the kiln 41. The charges 15*a*, 15*b* may optionally move in opposing directions allowing an outgoing hot dried charge 15*a* to transfer heat to an area in the vicinity of an incoming cool wet charge 15*b* at each end of the kiln 41 prior to exiting. In this embodiment, the kiln 41 includes a moisture measuring system 9 comprising two sets of the first and second electrically conductive elements 23, 27, one set for each stack of timber 15*a*, 15*b***.

Both sets of the first and second electrically conductive elements 23, 27 may be electrically connected to the same electronic controller E, or each set of the first and second electrically conductive elements 23, 27 may be electrically connected to a respective separate electronic controller E.

With reference to FIGS. 6 to 8, the first and second electrically conductive elements 23, 27 of each kiln are configured to be resiliently movable with respect to the kiln chamber 13 and to the charge of timber 15 such that as the charge of timber 15 is moved into position, the charge of timber 15 contacts the first and second electrically conductive elements 23, 27. Further movement of the charge of timber 15 into the kiln chamber 13, can cause further resilient movement of the first and second electrically conductive elements 23, 27, causing the first and second electrically conductive elements 23, 27 to more fully contact the charge of timber 15.

With reference to FIGS. 6 to 8, the mounts 25, 29 are fixed in position in the kiln chamber 13, such that the first and/or second electrically conductive elements 23, 27 resiliently deform against the timber charge 15, for example as the timber charge 15 is moved into and along the chamber 13.

Alternatively, the mounts 25, 29, and/or the first and second electrically conductive elements 23, 27 may be movably mounted in the chamber 13 such that the timber charge 15 is first moved into the desired position in the chamber 13, and the first and second electrically conductive elements 23, 27 are subsequently moved towards the charge of timber 15, such that the first and second electrically conductive elements 23, 27 contact and resiliently deform against the surface of the charge of timber 15.

With reference to FIGS. 6 and 8, the first and second electrically conductive elements 23, 27 may respectively contact opposed sides of the charge of timber 15.

This movement of the first and second electrically conductive elements 23, 27 relative to the charge of timber 15 allows the first and second electrically conductive elements 23, 27 to accommodate any inconsistencies in the contact portion of the charge of timber 15, whilst also enabling a strong and reliable contact to be made with that contact portion, sufficient to enable to the first and second electrically conductive elements 23, 27 and the portion of the charge of timber 15 between the first and second electrically conductive elements 23, 27 to together function as a capacitor. For example, the contact portion may extend over multiple individual pieces of timber, the surface of each may be different or variable, in particular the shape, texture and contours of the contact portion may be non-constant. For example, the contact portion is unlikely to be of uniform structure, so not planar, not straight, not of consistent texture.

The movement between the first and second electrically conductive elements 23, 27 and the charge of timber 15 may be provided by the mounts 25, 29 being configured to be movably mounted to the kiln chamber 13, such that the first electrically conductive element 23 and the first mount 25 are together resiliently movable relative to the kiln chamber 13 upon contact with the charge of timber 15. The second electrically conductive element 27 and second mount 29 could be structured similarly or identically. In this example the first and second electrically conductive elements 23, 27 cannot move relative to their respective mounts 25, 29, that is the conductive elements 23, 27 and their respective mounts 25, 29 move together as one component.

The movement between the first and second electrically conductive elements 23, 27 and the charge of timber 15 may additionally or alternatively be provided by the first and second electrically conductive elements 23, 27 themselves being resiliently deformable, such that the first and second electrically conductive elements 23, 27 resiliently deform upon contact with the charge of timber 15, 15A, 15B. In this example the first and second electrically conductive elements 23, 27 can move relative to their respective mounts 25, 29. The mounts 25, 29 may be fixed with respect to the kiln chamber 13, or may themselves be movably mounted with respect to the kiln chamber 13.

Consequently, the first and second electrically conductive elements 23, 27 are configured to resiliently deform so as to at least partially conform to the shape of the contact portions of the charge of the timber 15, 15A, 15B that are in contact with the first and second electrically conductive elements 23, 27.

Figure 9:
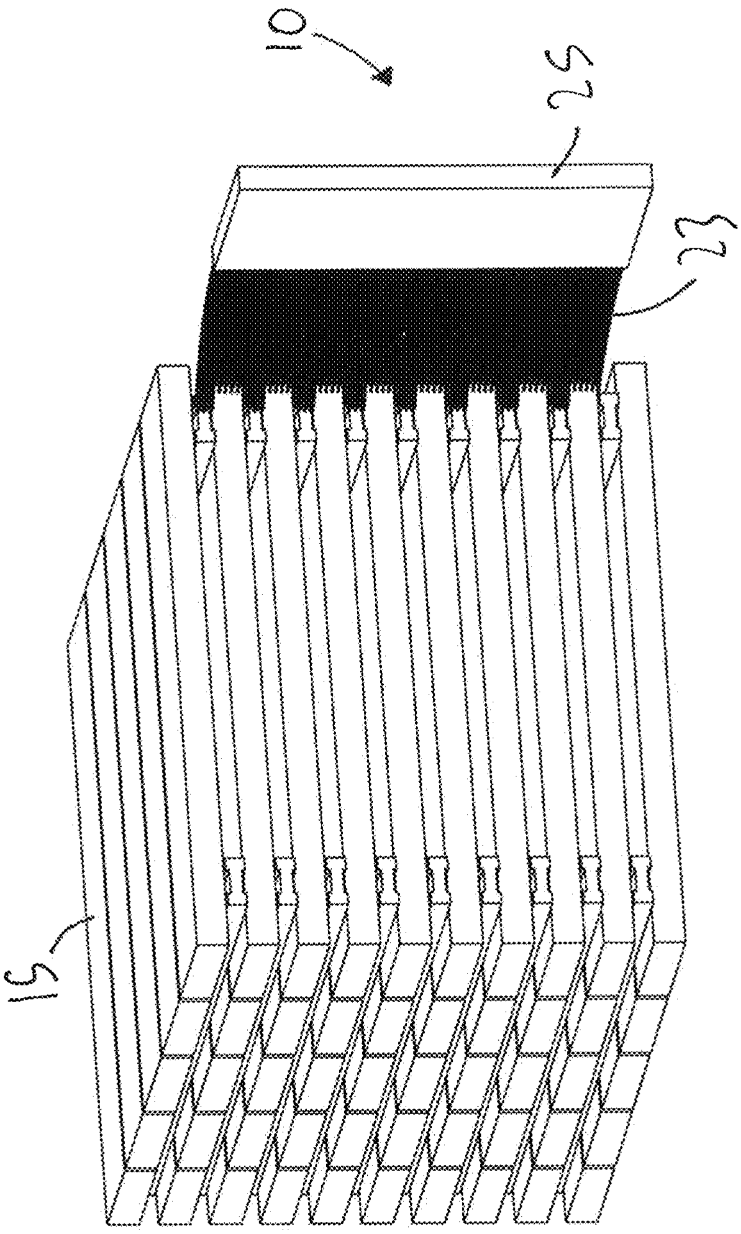
FIG. 9 is an enlarged schematic perspective view of a timber stack and a first flexible electrical contact of the moisture measurement system of FIGS. 6 to 8.
Figure 10:
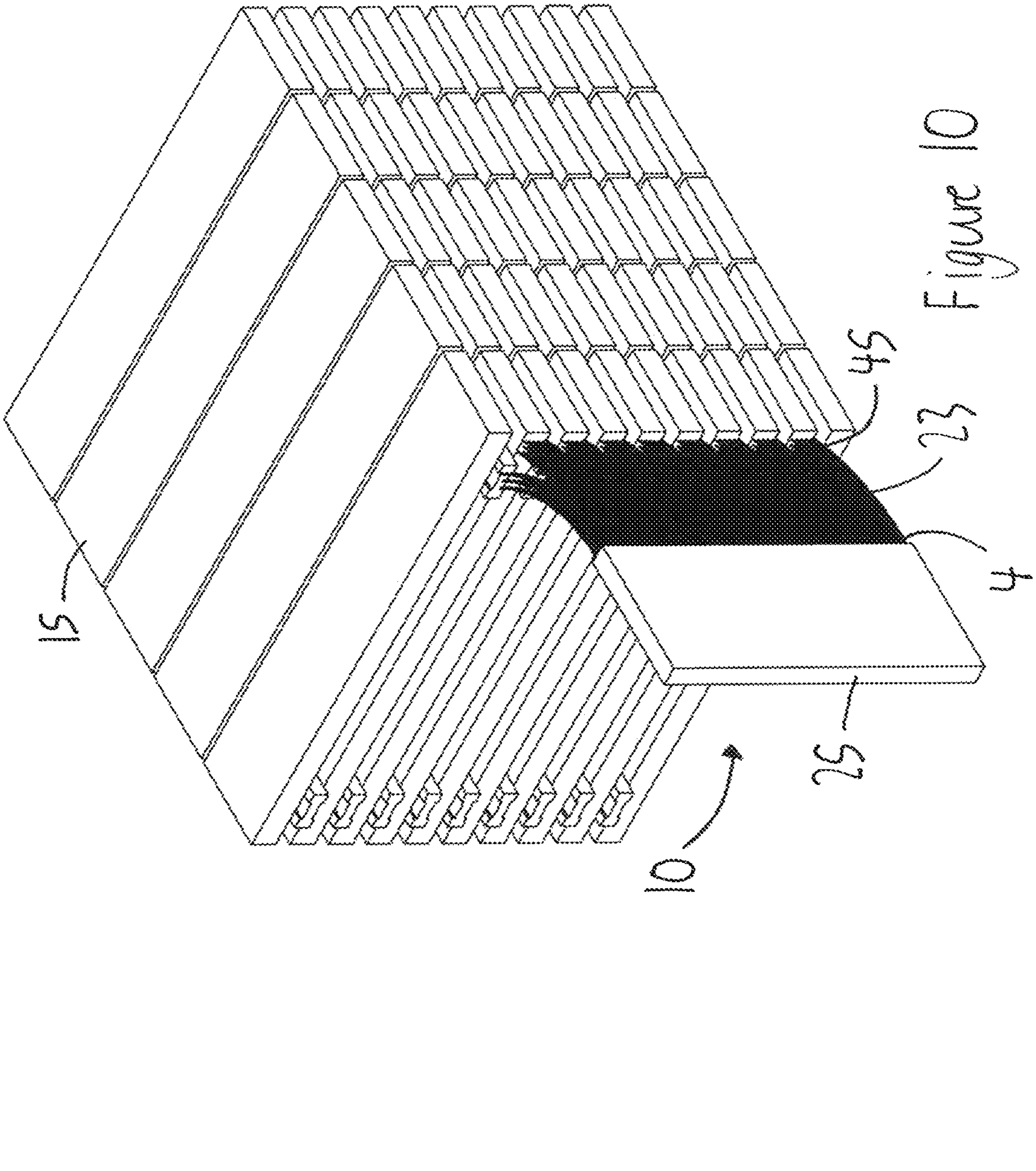
FIG. 10 is another enlarged perspective corresponding to FIG. 9.

With references to FIGS. 9 and 10, the first and second electrically conductive elements 23, 27 may be elongate. In the following description we refer to the first electrically conductive element 23. However, the second electrically conductive element 27 can be similar or identical.

With reference to FIGS. 9 and 10, the first electrically conductive element 23 comprises a proximal end 43 at the first mount 25, and a distal end 45 remote from the first mount and configured to contact the charge of timber 15, the first electrically conductive element 23 being configured to be resiliently movable by flexing along its length, between the proximal and distal ends 43, 45.

With reference to FIGS. 9 and 10, the first electrically conductive element 23 may comprise a flexible, electrically conductive strip, each being a single elongate blade of substantially planar electrically conductive material. The blade 23 functions rather like a wiper, and resiliently deforms upon contact with the charge of timber 15. Each of the electrically conductive elements 23, 27 may therefore comprise a single flexible electrically conductive member. Alternatively, with reference to FIGS. 9 and 10, each electrically conductive strip may be in the form of a brush comprising a plurality of elongate, electrically conductive bristles.

The electrically conductive elements 23, 27 may continuously resiliently deform as the charge of timber 15 continues to move into, along and/or from the chamber 13.

Figure 11:
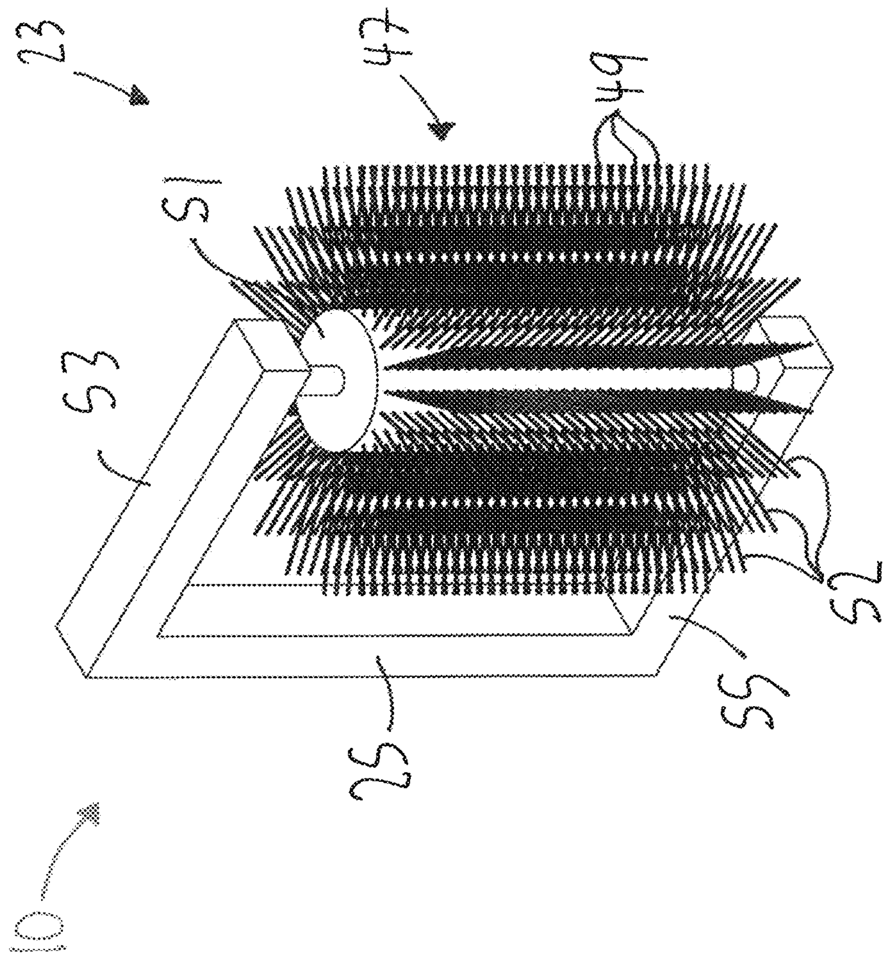
FIG. 11 is an enlarged schematic perspective view of another flexible electrical contact in accordance with this disclosure.

With reference to FIG. 11, the first electrically conductive member 23 may comprise an electrically conductive brush 47 comprising a plurality of elongate, electrically conductive bristles 49, arranged in a plurality of radially outwardly extending bristle arrays 52. Each of the electrically conductive elements 23, 27 therefore comprises a plurality of flexible electrically conductive members.

The electrically conductive brush 47 comprises a hub 51 that is rotatably mounted on the first mount 25, the first mount 25 comprising upper and lower, parallel arms 53, 55 between which the hub 51 fits. With reference to FIG. 11, the axis of rotation of the brush 47 may be substantially vertical. The electrical connections with the electronic controller E may be provided via the arms 53, 55.

The brush 47 can therefore rotate about its axis, and relative to the first mount 25, as the charge of timber 15 is moved into contact with the brush 47. That contact deforms the bristles 49 of the brush 47 as the charge of timber 15 continues to move. The bristles 49 of the brush 47, thus deform to compensate for any irregularities in the contact portion of the timber stack 15, and consequently ensure sufficient contact is made with the timber stack 15 for the brushes 47 of the first and second electrically conductive members 23, 27 to function as a capacitor.

With reference to FIG. 11, the bristles 49 of the brush 47 are arranged in a plurality of bristle arrays 51, each array 51 extending radially outwardly from the hub 51, and also being spaced from the adjacent arrays 51.

Figure 12:
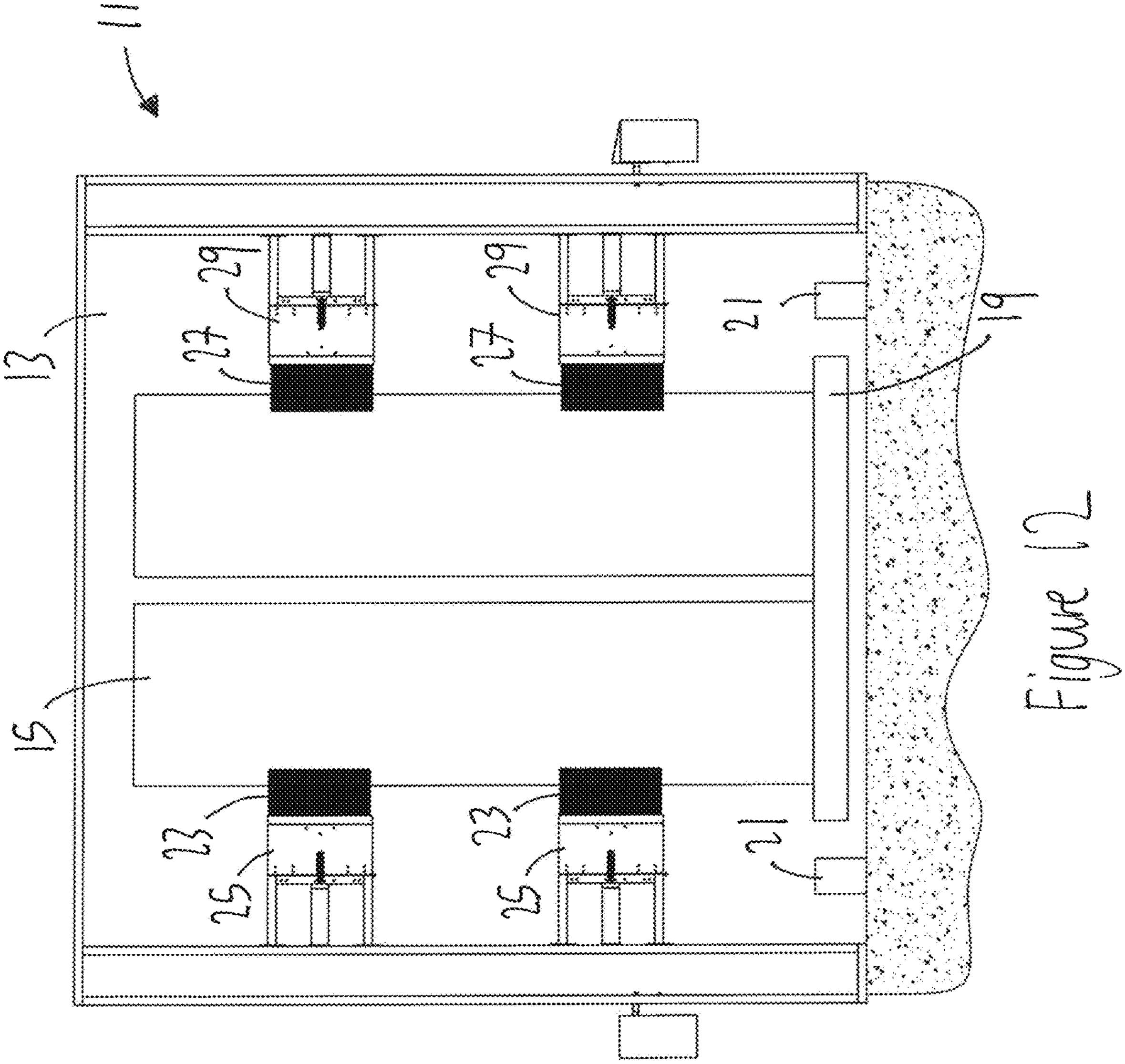
FIG. 12 is an end view of a single path timber drying kiln including another moisture measurement system in accordance with the present disclosure.

With reference to FIG. 12 a kiln 11 and moisture measuring system 9 in accordance with this disclosure is provided comprising multiple pairs of first and second electrically conductive members 23, 27, and in this example two pairs. The first electrically conductive members 23 are provided at one side of the kiln chamber 13, and the second electrically conductive members 27 are provided at an opposite side of the kiln chamber 13. The first conductive members 23, and the second conductive members 27 are vertically spaced, such that one of the first electrically conductive members 23 is above the other on one side of the chamber 13, and one of the second electrically conductive members 27 is also above the other on the opposed side of the chamber 13.

The first and second electrically conductive members 23, 27 may be blade type conductive members as per FIGS. 9 and 10 (whether a single solid electrically conductive element or a brush type comprising a plurality of electrically conducting bristles), or brush type conductive members as per FIG. 11, or any other suitable type of electrically conductive member that is resiliently movable to adapt to the surface irregularities of the charge of timber 15.

With reference to FIG. 12, providing multiple pairs of first and second electrically conductive members 23, 27 enables multiple timber moisture measurements to be made, for example so as to assess the moisture content in different portions of the timber stack 15. FIG. 12 shows two pairs of first and second electrically conductive members 23, 27, but any suitable number of pairs may alternatively be used, for example depending on the size (height, width and/or length) of the timber stack 15, and/or on the accuracy of moisture measurements required. Moisture measurements could also be made at different locations in the kiln (for example near the entrance and near the exit of the chamber 13), or could be made in different sub-chambers of the kiln (for example one measurement in an initial heat transfer zone, one measurement in a central heating zone, and a further measurement in a subsequent heat transfer zone).

Each electrically conductive member may be made of, or comprise, one or more metals.

Each electrically conductive member may be made of, or comprise one or more non-metals. For example, the first electrically conductive member may be made from a carbon material.

The electronic controller E may be configured to generate multiple signals indicative of the dielectric properties of the timber, with these multiple signals being used to ultimately determine the moisture content. For example, electric charge can be delivered to the first and/or second electrically conductive elements 23, 27 sequentially at different or varying frequencies, such that a different signal is generated for each frequency.

Calibration of the system may be required between drying operations if the charge size differs.

Effects in the signal caused by changes in kiln temperature (e.g. cable attenuation, changes in amplitude and/or phase), are accounted for by known methods in the art. In some embodiments, the temperature sensitivity of the cables 31 and other electrical equipment can be ignored for the purposes of moisture content determination as the full implementation of the method can continually estimate the cable attenuation and fully compensate the readings for these.

Variations and modifications to the preferred embodiments of the disclosure described herein will be apparent to those skilled in the art. It is intended that such variations and modifications may be made without departing from the scope of the disclosure and without diminishing its attendant advantages.

Advantages of the Disclosure

Aspects of the present disclosure allows remote, substantially automatic and contact-less moisture measuring of one or more timber charge(s) while the charge(s) are in a drying kiln. Aspects of the disclosure may thus remove the requirement for operators to enter a kiln to attend to moisture measurement, and may also remove the requirement for operators to manually install, manipulate or remove plates in each timber charge, thus improving the safety of the operators.

Further, the present disclosure is particularly well suited for progressive and continuous drying kilns, as the moisture measurements of each timber charge can be taken as the charge passes between the first electrically conductive element and the second electrically conductive element. It is therefore envisaged that the disclosure encompasses a series of pairs of first and second electrically conductive elements along a drying kiln such that as a drying charge of timber moves through the kiln the moisture level of the charge can be taken at multiple instances spaced apart along the path of the timber charge through the kiln.

The foregoing advantages described herein are not intended to limit the scope of the disclosure, and further advantages will be apparent to those skilled in the art.

Reference to any prior art in this specification is not, and should not be taken as, an acknowledgement or any form of suggestion that the prior art forms part of the common general knowledge in the field of endeavour in any country in the world.

Where reference is used herein to directional terms such as ‘up’, ‘down’, ‘forward’, ‘rearward’, ‘horizontal’, ‘vertical’ etc., those terms refer to when the apparatus is in a typical in-use position, and are used to show and/or describe relative directions or orientations.

Unless the context clearly requires otherwise, throughout the description and the claims, the words “comprise”, “comprising”, and the like, are to be construed in an inclusive sense as opposed to an exclusive or exhaustive sense, that is to say, in the sense of “including, but not limited to”.

The terms “approximately,” “about,” and “substantially” as used herein represent an amount close to the stated amount that still performs a desired function or achieves a desired result. For example, in some embodiments, as the context may permit, the terms “approximately”, “about”, and “substantially” may refer to an amount that is within less than or equal to 10% of, within less than or equal to 5% of, and within less than or equal to 1% of the stated amount.

Reference to any prior art in this specification is not, and should not be taken as, an acknowledgement or any form of suggestion that that prior art forms part of the common general knowledge in the field of endeavour in any country in the world.

The disclosed apparatus and systems may also be said broadly to consist in the parts, elements and features referred to or indicated in the specification of the application, individually or collectively, in any or all combinations of two or more of said parts, elements or features.

Where, in the foregoing description reference has been made to integers or components having known equivalents thereof, those integers are herein incorporated as if individually set forth.

Depending on the embodiment, certain acts, events, or functions of any of the algorithms, methods, or processes described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially.

It should be noted that various changes and modifications to the presently preferred embodiments described herein will be apparent to those skilled in the art. Such changes and modifications may be made without departing from the spirit and scope of the disclosed apparatus and systems and without diminishing its attendant advantages. For instance, various components may be repositioned as desired. It is therefore intended that such changes and modifications be included within the scope of the disclosed apparatus and systems. Moreover, not all of the features, aspects and advantages are necessarily required to practice the disclosed apparatus and systems. Accordingly, the scope of the disclosed apparatus and systems is intended to be defined only by the claims that follow.

The invention claimed is:

1. A timber drying kiln electrical contact system for a timber drying kiln comprising at least one timber drying chamber; the electrical contact system comprising:

a first electrically conductive element; a first mount and a first electrical connector; and a second electrically conductive element, a second mount and a second electrical connector;

wherein the first mount and the second mount are configured to respectively mount the first electrically conductive element and the second electrically conductive element inside the timber drying chamber such that the first electrically conductive element and the second electrically conductive element are spaced apart; and wherein the first electrical connector is configured to electrical connect the first electrically conductive element to an electronic controller of a kiln moisture measurement system, and the second electrical connector is configured to electrically connect the second electrically conductive element to an electronic controller, such that electric charge can be transmitted between the first electrically conductive element and/or the second electrically conductive element, and the electronic controller;

wherein the first electrically conductive element and the second electrically conductive element are each resiliently movable against respective contact portions of a charge of timber.

2. The system of claim 1 wherein the first electrically conductive element is movably mounted on the first mount, so as to be resiliently movable relative to the first mount, and the second electrically conductive element is movably mounted on the second mount, so as to be resiliently movable relative to the second mount.

3. The system of claim 1 wherein each mount is configured to be movably mounted to the timber drying chamber such that the first electrically conductive element and the first mount are together resiliently movable relative to the timber drying chamber, and such that the second electrically conductive element and the second mount are together resiliently movable relative to the timber drying chamber.

4. The system of claim 1 wherein each electrically conductive element is resiliently deformable, such that each electrically conductive element resiliently deforms upon contact with the charge of timber.

5. The system of claim 4 wherein each electrically conductive element continuously resiliently deforms as the charge of timber moves into and/or along the timber drying chamber.

6. The system of claim 1 wherein each electrically conductive element is configured to resiliently deform so as to at least partially conform to a shape of a respective contact portion of the charge of timber that is in contact with each electrically conductive element.

7. The system of claim 1 wherein each electrically conductive element is elongate and comprises a proximal end at the mount, and a distal end configured to contact the charge of timber, each electrically conductive element having a length defined between the proximal end and the distal end, the first electrically conductive element being configured to resiliently flex along it's the length of the first electrically conductive element, and the second electrically conductive element being configured to resiliently flex along the length of the second electrically conductive element.

8. The system of claim 4 wherein each electrically conductive element comprises a single flexible electrically conductive member.

9. The system of claim 4 wherein each electrically conductive element comprises a plurality of flexible electrically conductive members.

10. The system of claim 1 wherein each electrically conductive element comprises an electrically conductive brush comprising a plurality of electrically conductive bristles.

11. The system of claim 1 wherein the first electrically conductive element is rotatably mounted on the first mount, and the second electrically conductive element is rotatably mounted on the second mount.

12. A kiln moisture measurement system for measuring a moisture content of at least a portion of a charge of timber in a timber drying kiln comprising at least one timber drying chamber; the kiln moisture measurement system comprising:

a first electrically conductive element; a first mount and a first electrical connector; and a second electrically conductive element, a second mount and a second electrical connector;

wherein the first mount and the second mount are configured to respectively mount the first electrically conductive element and the second electrically conductive element inside the at least one timber drying chamber such that the first electrically conductive element and the second electrically conductive element are spaced apart; and wherein the first electrical connector is configured to electrically connect the first electrically conductive element to an electronic controller, and the second electrical connector is configured to electrically connect the second electrically conductive element to the electronic controller, such that electric charge can be transmitted between the first electrically conductive element and/or the second electrically conductive element, and the electronic controller;

wherein the first electrically conductive element and the second electrically conductive element are each resiliently movable against respective contact portions of the charge of timber when the charge of timber is adjacent the first electrically conductive element and the second electrically conductive element; and wherein the electronic controller is subsequently configured to:

measure one or more dielectric properties of a portion of timber between the first electrically conductive element and the second electrically conductive element to determine measured dielectric properties; and to subsequently determine the moisture content of the charge of timber based on the measured one or more dielectric properties.

13. The system of claim 12 wherein the first electrically conductive element and the second electrically conductive element are mounted such that the one or more dielectric properties are measured substantially transversely across the chamber.

14. The system of claim 12 wherein the first electrically conductive element and the second electrically conductive element are mounted such that the one or more dielectric properties are measured substantially longitudinally along the chamber.

15. The system of claim 12 wherein the first electrically conductive element and the second electrically conductive element are mounted such that the one or more dielectric properties are measured along an inclined path through the chamber.

16. A timber drying kiln comprising the system of claim 1.

17. The kiln of claim 16 comprising a single timber drying chamber configured to dry a charge of timber with the charge of timber in a single position in the timber drying chamber.

18. The kiln of claim 16 comprising multiple tinder drying chambers, wherein the or each charge of timber can be moved to each timber drying chamber.

19. The kiln of claim 16 wherein the kiln comprises one or more pathways along which the charge of timber can be moved through the or each timber drying chamber.

20. A kiln moisture measurement method for measuring a moisture level of a charge of timber in a timber drying chamber of a timber drying kiln, including steps of:

moving the charge of timber into contact with a first electrically conductive element and a second electrically conductive element such that the first electrically conductive element and the second electrically conductive element resiliently contact respective contact portions of the charge of timber;

using an electronic controller to apply electrical charge to one or both of the first electrically conductive element and/or the second electrically conductive element;

using the electronic controller to subsequently measure one or more dielectric properties of timber between the first electrically conductive element and the second electrically conductive element;

subsequently determining a moisture level of the charge of timber based on the one or more dielectric properties.

* * * * *